US010933706B2

(12) United States Patent
Shenaq et al.

(10) Patent No.: US 10,933,706 B2
(45) Date of Patent: Mar. 2, 2021

(54) VEHICLE TOW HOOK

(71) Applicant: Ford Global Technologies, LLC, Dearborn, MI (US)

(72) Inventors: Mohammed Shenaq, Dearborn, MI (US); Richard Lisowski, Troy, MI (US); Mustafa Ahmed, Canton, MI (US); Sudip Sankar Bhattacharjee, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 276 days.

(21) Appl. No.: 16/208,891

(22) Filed: Dec. 4, 2018

(65) Prior Publication Data

US 2020/0171894 A1    Jun. 4, 2020

(51) Int. Cl.
*B60D 1/04* (2006.01)
*B60D 1/14* (2006.01)
*B60D 1/56* (2006.01)
*B60D 1/48* (2006.01)

(52) U.S. Cl.
CPC ............. *B60D 1/04* (2013.01); *B60D 1/143* (2013.01); *B60D 1/488* (2013.01); *B60D 1/565* (2013.01)

(58) Field of Classification Search
CPC .......... B60D 1/50; B60D 1/243; B60D 1/565; B60D 1/488; B60D 1/143; B60D 1/04; B62B 5/064

USPC .................................................. 280/498, 483
See application file for complete search history.

(56) References Cited

U.S. PATENT DOCUMENTS

| 4,157,838 A  * | 6/1979 | von Allworden .... A01B 59/006 280/508 |
| 2009/0108566 A1* | 4/2009 | Asjad ....................... B60D 1/54 280/498 |
| 2011/0209310 A1* | 9/2011 | Szczepanek ............. B60D 1/04 24/599.5 |

FOREIGN PATENT DOCUMENTS

| CN | 201264493 Y | 7/2009 |
| CN | 202345319 U | 7/2012 |
| CN | 205930075 U | 2/2017 |
| EP | 2248688 B1 | 10/2013 |
| JP | 2007237867 A | 9/2007 |
| KR | 101080724 B1 | 11/2011 |
| KR | 1020120041363 A | 5/2012 |

* cited by examiner

*Primary Examiner* — Ruth Ilan
*Assistant Examiner* — Hosam Shabara
(74) *Attorney, Agent, or Firm* — Frank A. MacKenzie; Bejin Bieneman PLC

(57) ABSTRACT

An assembly includes a bumper. The assembly further includes a base fixed relative to the bumper and a hook supported by the base. The hook is rotatable relative to the base between an extended position and a retracted position. The assembly further includes a spring between the base and the hook positioned to bias the hook from the retracted position to the extended position.

21 Claims, 9 Drawing Sheets

VEHICLE TOW HOOK

BACKGROUND

Vehicles typically include tow hooks used for towing the vehicle, for example, if the vehicle becomes stuck in mud, snow, a ditch, etc. The tow hooks serve as attachment points for straps or chains to be attached to the vehicle, and the straps/chains are then used to pull the vehicle to a more suitable driving surface. The tow hooks may be fixed to a frame of the vehicle so that the pulling force on the tow hook is transmitted to the frame of the vehicle. The tow hooks may be located at a front end of a vehicle and/or at a rear end of the vehicle.

DETAILED DESCRIPTION

An assembly includes a vehicle frame. A base may be fixed relative to the vehicle frame and a hook may be supported by the base. The hook may be rotatable relative to the base between an extended position and a retracted position. A spring may be between the base and the hook positioned to bias the hook toward the extended position.

A hinge may be between the hook and the base.

The spring may be coiled about the hinge.

The hinge may include a post between the hook and the base.

The spring may be coiled about the post.

The assembly may also include a second spring coiled about the post with the second spring positioned below the spring.

A collar may be fixed to the post between the spring and the second spring.

The hook may be rotatable relative to the base to a second retracted position opposite the retracted position.

The base may extend from the vehicle frame along an axis and the hinge may be offset from the axis in a cross-vehicle direction.

The hinge may have a rotational axis that is vertical.

The base may curve from the vehicle frame to the hinge defining a recess between the vehicle frame and the hook. The hook may rotate into the recess from the extended position to the retracted position.

The base may curve from the vehicle frame to the hinge in a first cross-vehicle direction. The hook may curve from the hinge to a free end in a second cross-vehicle direction opposite the first cross-vehicle direction.

The base may define a recess and the hook may be rotatable into the cavity.

The hook may be rotatable relative to the base about a vertical axis.

The base may define a recess and the hook may be rotatable into the cavity.

The base may curve from the vehicle frame to the hook in a first cross-vehicle direction. The hook may curve from the base to a free end in a second cross-vehicle direction opposite the first cross-vehicle direction.

The base may define a recess and the hook may be rotatable into the recess.

The hook may be unbiased by the spring when the hook is in the extended position.

The assembly may include a bumper with the hook extending through the bumper in the extended position and recessed behind the bumper in the retracted position.

The spring may be a torsion spring.

Figure 3:
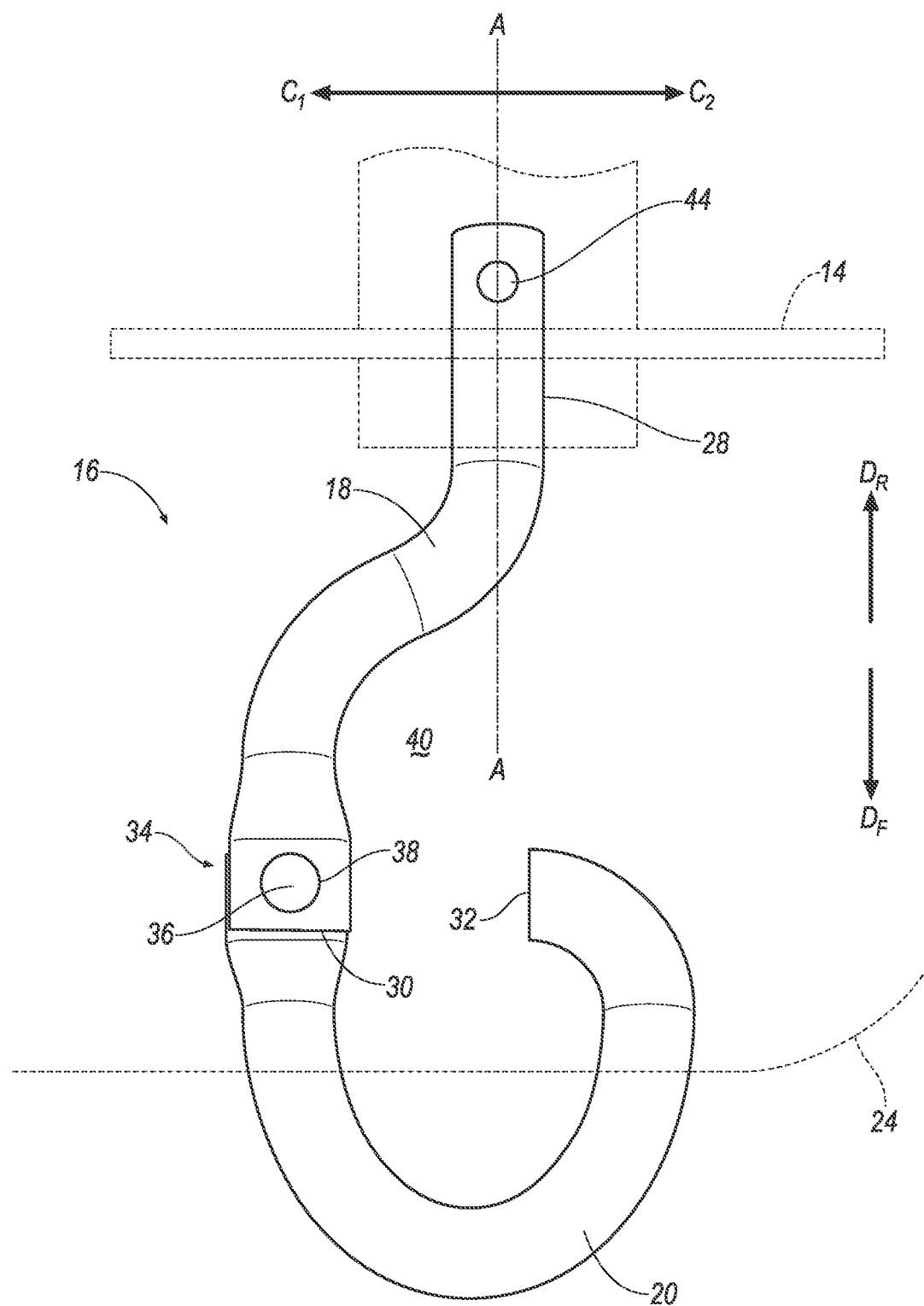
FIG. 3 is a top view of one of the tow hooks in an extended position with the frame and a bumper shown in broken lines.
Figure 4:
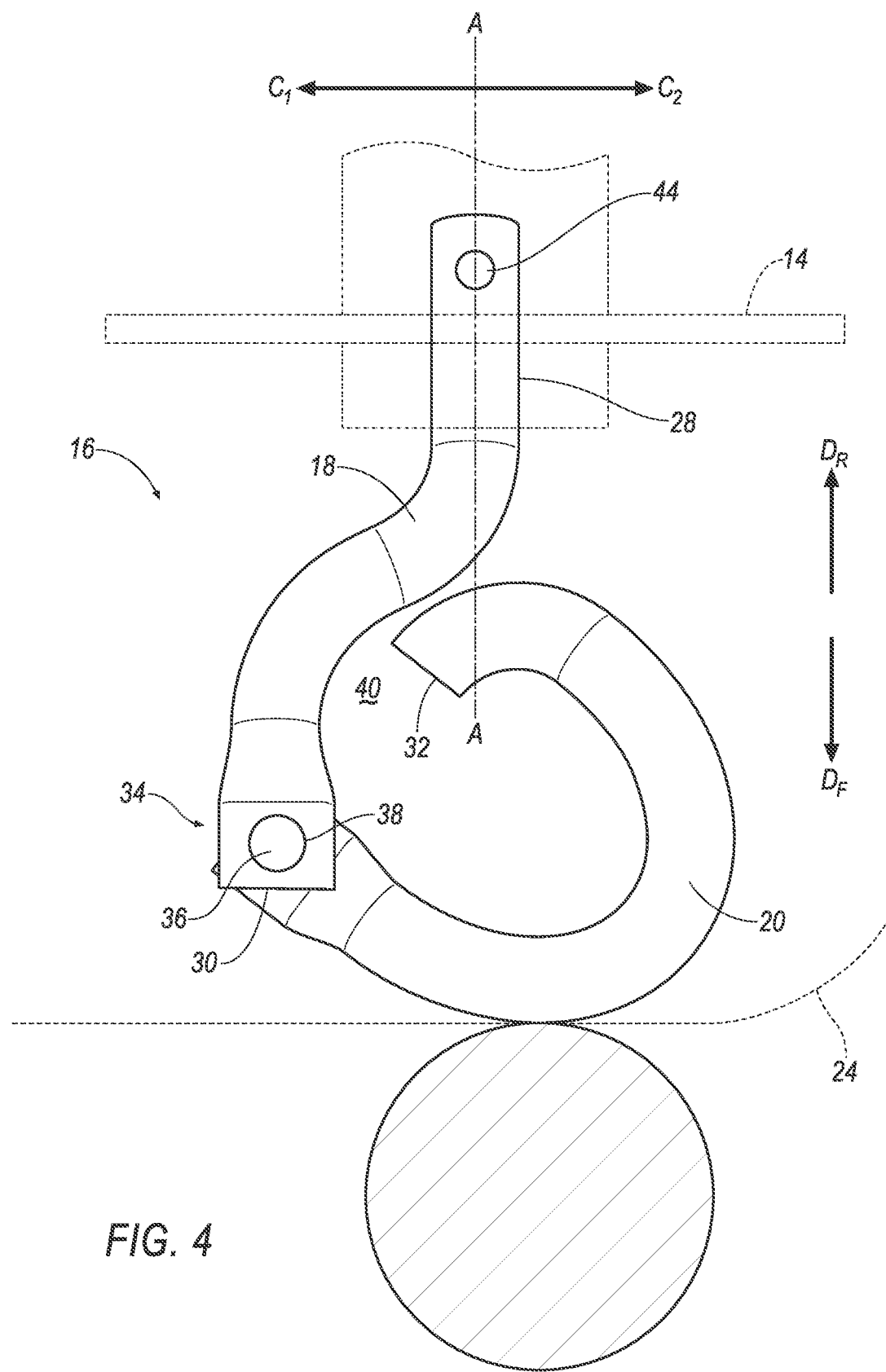
FIG. 4 is the perspective view of FIG. 3 with the tow hook in a retracted position.

With reference to the Figures, wherein like numerals indicate like parts throughout the several views, an assembly 10 of a vehicle 12 includes a vehicle frame 14 and a tow hook 16 fixed to the vehicle frame 14. The tow hook 16 includes a base 18 fixed relative to the vehicle frame 14 and a hook 20 supported by the base 18. The hook 20 is rotatable relative to the base 18 between an extended position, as shown in FIG. 3, and a retracted position, as shown in FIG. 4. The assembly 10 includes a spring 22, 122 between the base 18 and the hook 20 positioned to bias the hook 20 toward the extended position.

In the extended position, the tow hook 16 may be used, for example, to pull the vehicle 12. As an example, a strap or chain of a towing vehicle may be engaged with the hook 20 such that the vehicle 12 may be pulled to dislodge the vehicle 12 from mud, snow, a ditch, etc., and move the vehicle 12 to a more suitable driving surface. In the event of an impact of the hook, e.g., impact with a pedestrian or other object, the hook 20 moves to the retracted position to reduce force delivered by the hook 20 to the impacted object, e.g., a pedestrian protection test leg form, another vehicle, etc., and/or to reduce the likelihood of damage to the tow hook 16. When the force is removed from the hook, the spring 22, 122 returns the hook 20 to the extended position. In other words, the tow hook 16 is resettable and automatically resets to the extended position.

Figure 5:
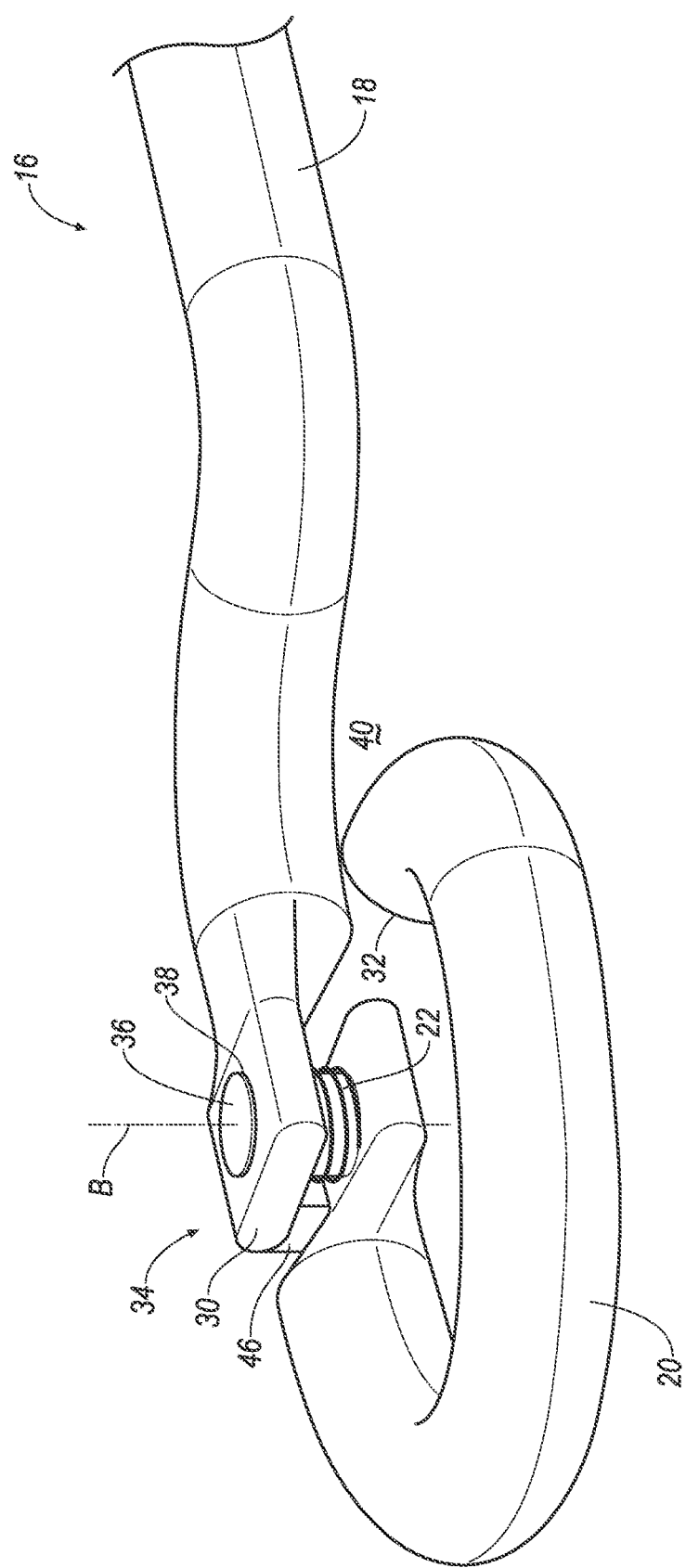
FIG. 5 is a perspective view of a portion of the tow hook.
Figure 6:
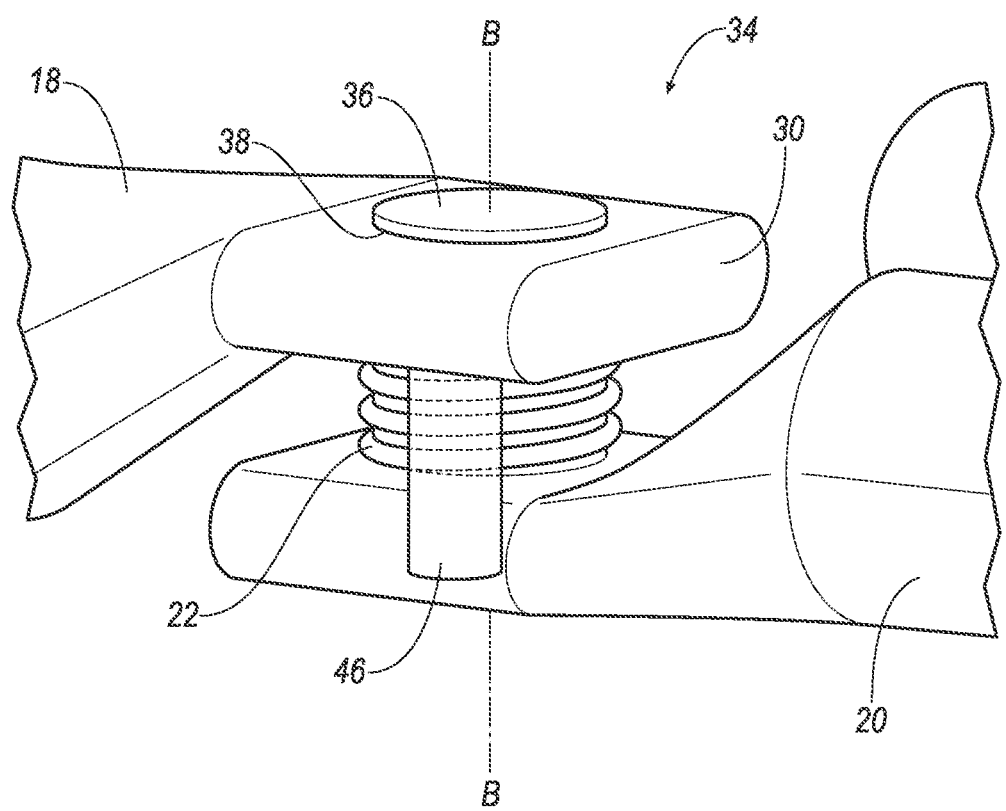
FIG. 6 is a perspective view of a hinge between a base and a hook of the tow hook.
Figure 7:
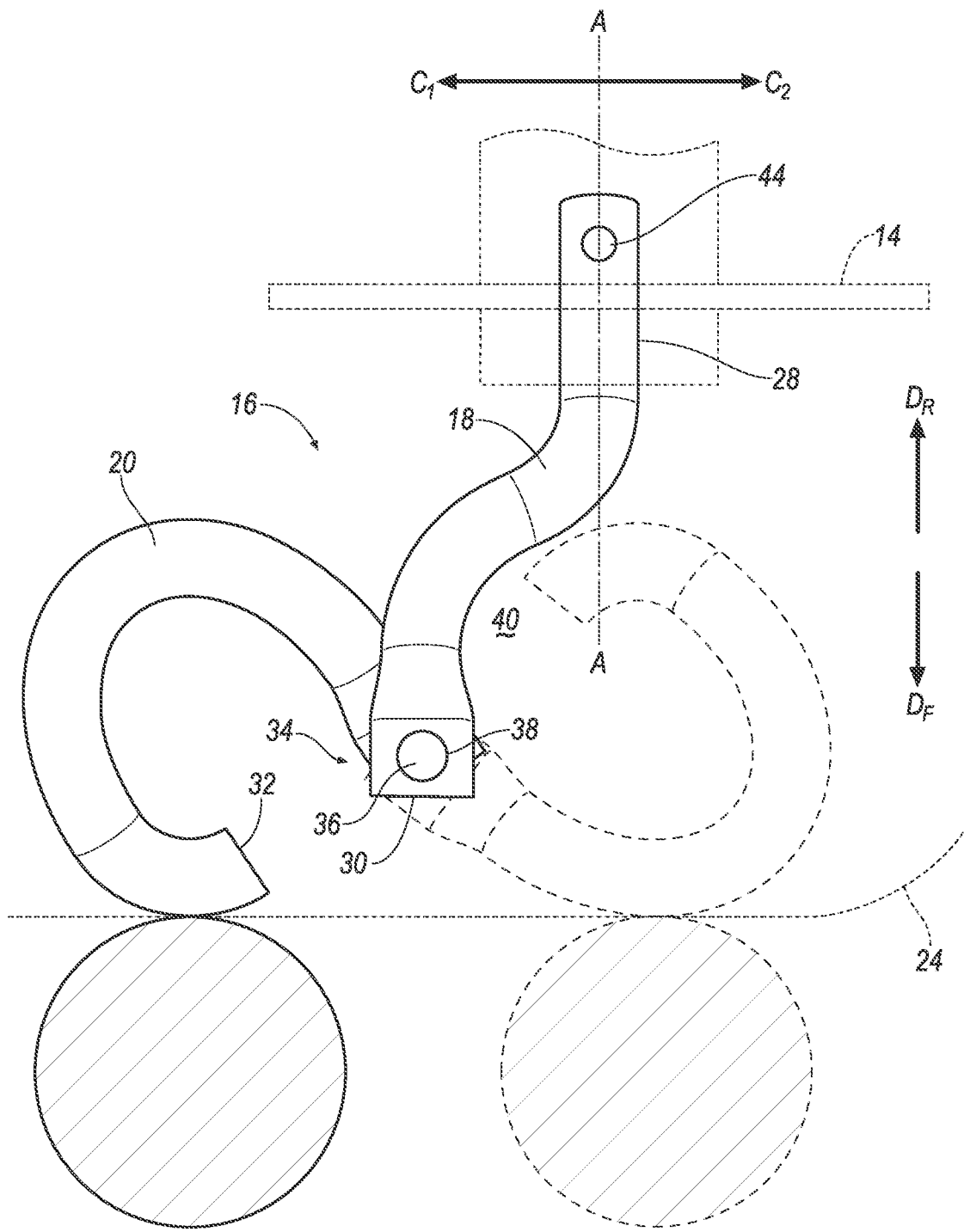
FIG. 7 is a perspective view of another embodiment of the tow hook shown in the retracted position in phantom lines and in a second retracted position in solid lines.
Figure 8:
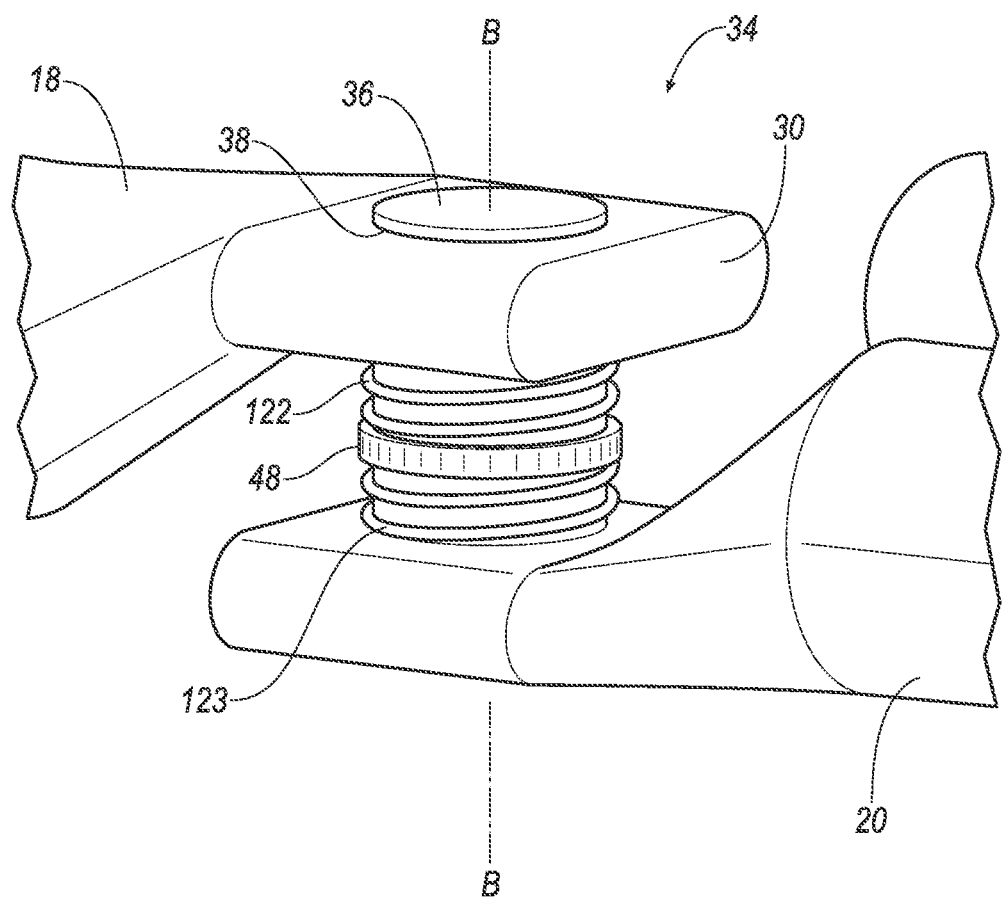
FIG. 8 is a perspective view of the embodiment of FIG. 7 a hinge between a base and a hook of the tow hook including two springs.
Figure 9:
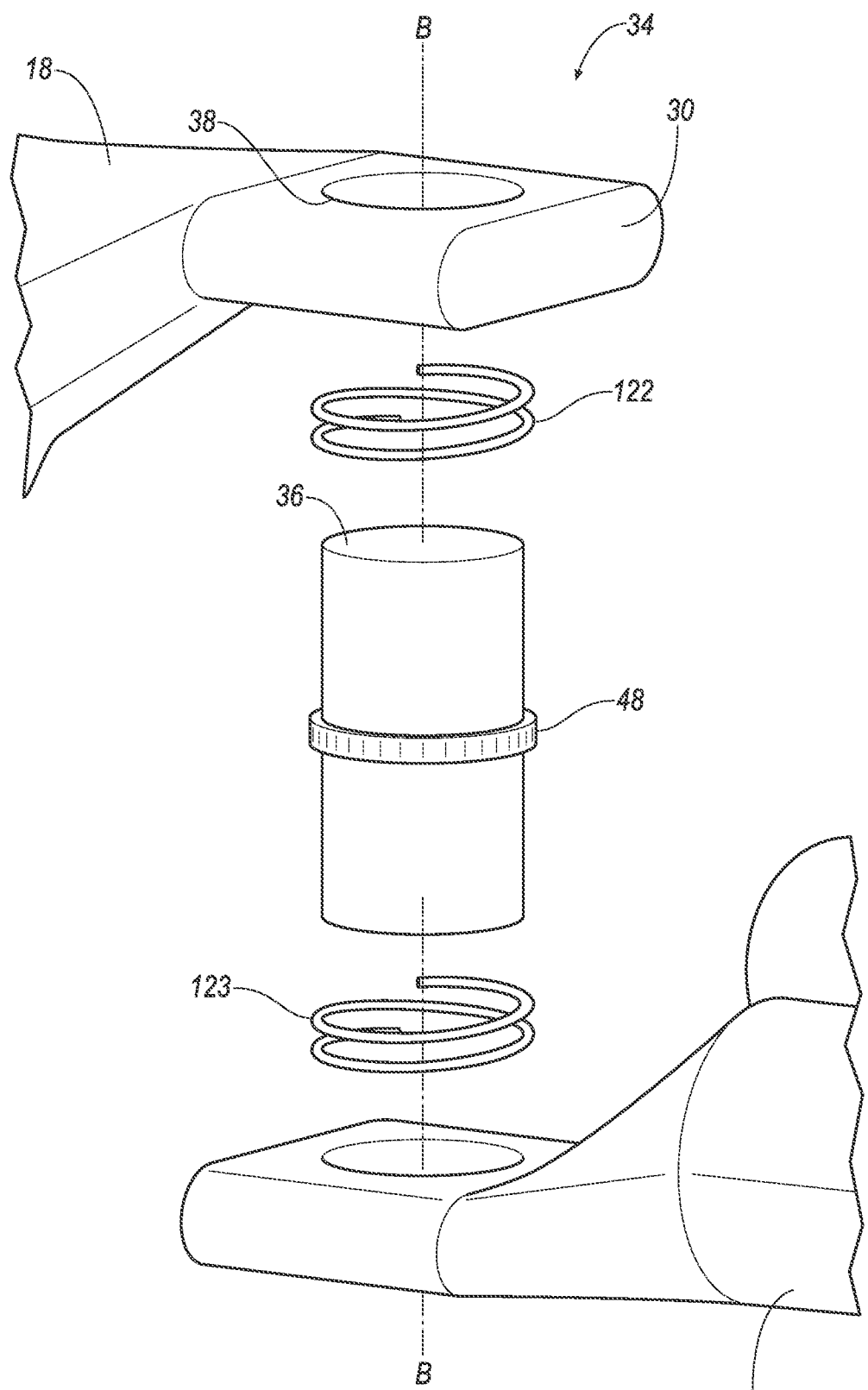
FIG. 9 is an exploded view of the embodiment of FIG. 7 with the hinge between the base and the hook of the tow hook including two springs.

One example embodiment of the tow hook is shown in FIGS. 3-6. Another example embodiment of the tow hook is shown in FIGS. 7-9.

The vehicle 12 may be any passenger or commercial automobile such as a car, a truck, a sport utility vehicle, a crossover, a van, a minivan, a taxi, a bus, etc.

The vehicle frame 14 may be of any suitable type. As one example, as shown in the figures, the vehicle 12 may have a body-on-frame construction (also referred to as a cab-on-frame construction). In such an example, the vehicle 12 includes a body 42, and the vehicle frame 14 and the body 42 are separate components, i.e., are modular, and the body 42 is supported on and affixed to the frame. As another example, the vehicle 12 may have a unibody construction. In the unibody construction, the body 42 and the vehicle frame 14 are unitary. The vehicle frame 14 and/or the body 42 may be of any suitable material, for example, steel, aluminum, etc.

The vehicle 12 includes a bumper 24. The bumper 24 is fixed to the vehicle frame 14. The bumper 24 may extend across a front of the vehicle 12. In an alternative, the bumper 24 may extend along a rear of the vehicle 12. The bumper 24 is elongated along a cross-vehicle axis $C_1$, $C_2$. The bumper 24 may present a class-A surface, i.e., a surface specifically manufactured to have a high-quality, finished aesthetic appearance free of blemishes.

Figure 1:
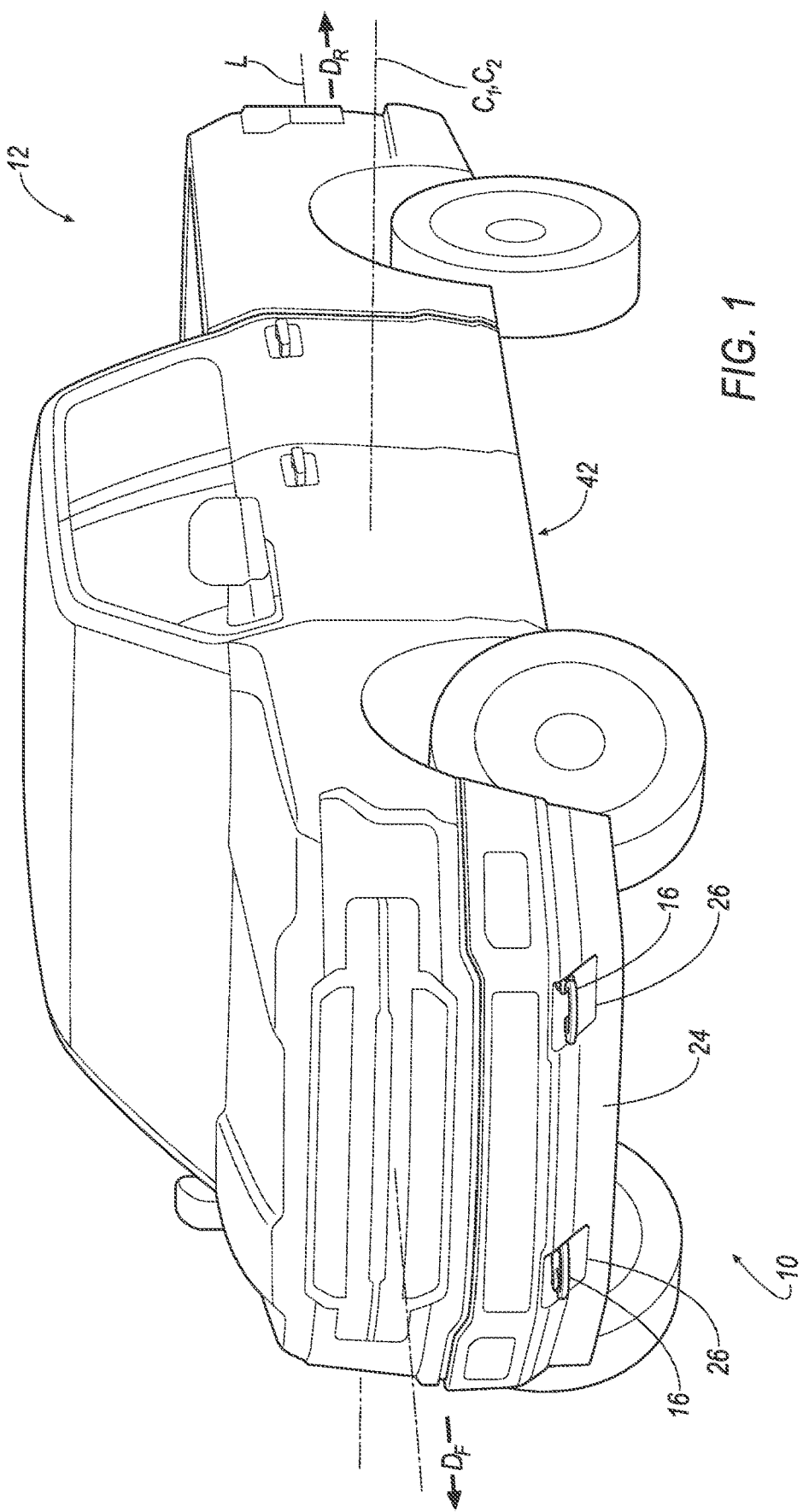
FIG. 1 is a perspective view of a vehicle including tow hooks.
Figure 2:
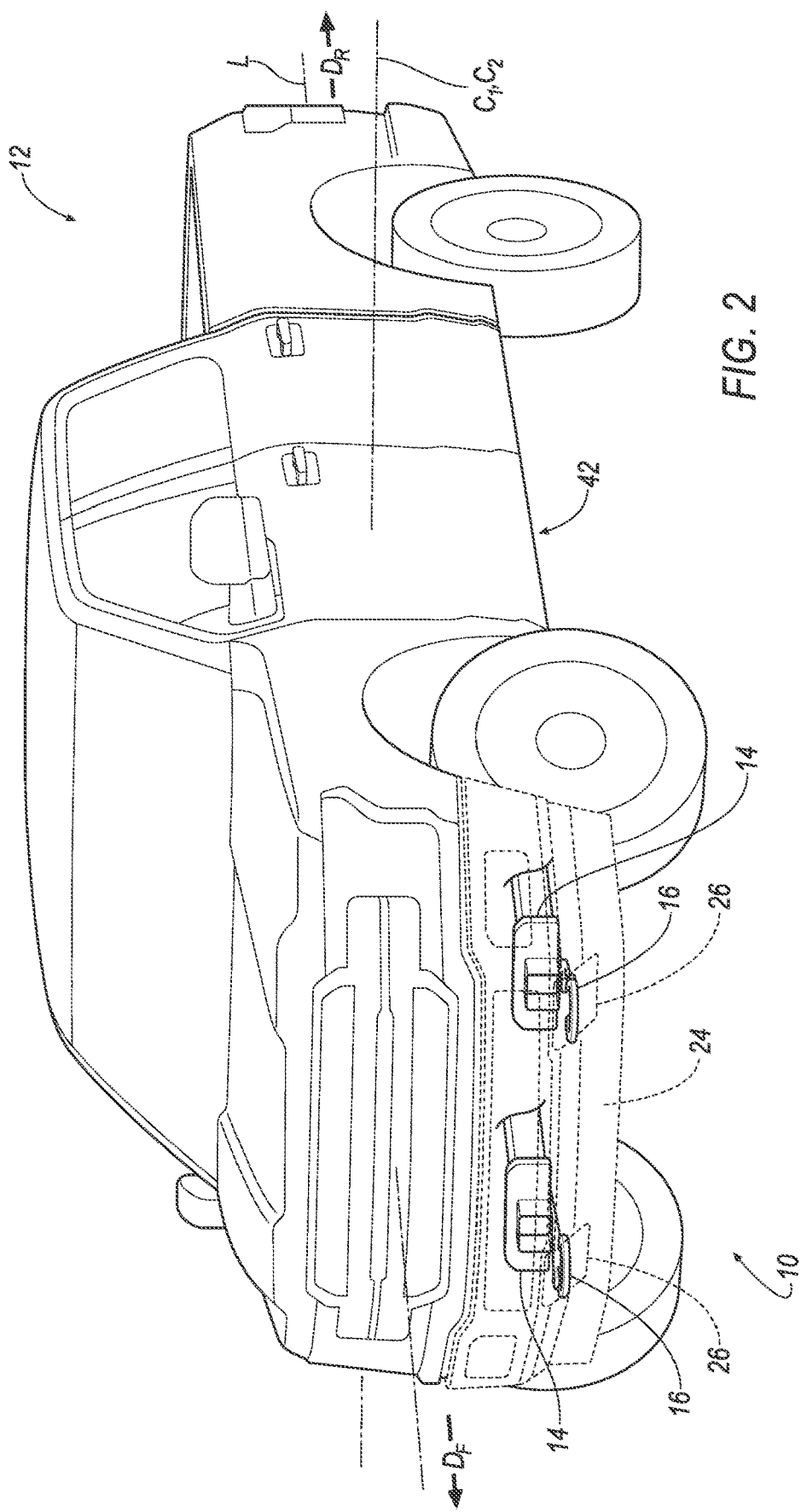
FIG. 2 is a perspective view of the vehicle including a frame the tow hooks fixed to the frame.

The hook 20 may extend through the bumper 24 in the extended position, as shown in FIGS. 1-3. For example, the bumper 24 may include an access hole 26 for the tow hook 16. The access hole 26 may be sized to permit access to the tow hook 16.

The hook 20 may be recessed behind the bumper 24 in the retracted position, as shown in FIG. 4. In other words, when impacted by an object, the hook 20 may retract behind the bumper 24 so that no portion of the hook 20 extends through the access hole 26. When the hook 20 is in the retracted position, the hook 20 is recessed behind the class-A surface of the bumper 24.

The vehicle 12 may include any suitable number of tow hooks 16. In examples including more than one tow hook 16, the tow hooks 16 may be identical. As an example, two tow hooks 16 are shown in FIGS. 1 and 2 and are identical to each other with common numerals identifying the common features. The vehicle 12 may include, for example, two tow hooks 16 at the front of the vehicle 12 and/or two tow hooks 16 at the rear of the vehicle 12.

As set forth above, the tow hook 16 includes the base 18, the hook, and the spring 22, 122. The base 18 of the tow hook 16 is fixed to the vehicle frame 14. For example, the base 18 may be fixed by a fastener 44 and/or by welding to the vehicle frame 14. The tow hook 16 extends from the vehicle frame 14 along an axis A. In other words, the base 18 includes a proximal end 28 that extends away from the vehicle frame 14 along the axis A. The axis A may be parallel to a vehicle-longitudinal axis L and perpendicular to the cross-vehicle axis $C_1$, $C_2$. As set forth below, the base 18 includes a distal end 30 between the proximal end 28 and the hook. The base 18 may be cantilevered from the frame, i.e., the distal end 30 is free from the frame and the weight of the base 18 is entirely supported on the vehicle frame 14 at the proximal end 28.

As set forth above, the hook 20 is supported by the base 18. In other words, the weight of the hook 20 rests on the base 18. The hook 20 is cantilevered from the base 18, i.e., extends from the base 18 to a free end 32 and the weight of the hook 20 is entirely supported by the base 18.

The hook 20 may be of any suitable shape. In one example, as shown in the figures, the hook 20 may include an open loop. In other words, the hook 20 includes an opening that, for example, may receive a strap or chain of a towing vehicle. As another example, the hook 20 may include a closed loop, i.e., may include an enclosed ring that may receive a strap or chain of a towing vehicle.

As set forth above, the hook 20 is rotatable relative to the base 18. As one example, the tow hook 16 may include a hinge 34 between the hook 20 and the base 18. The hinge 34 is at the distal end 28 of the base 18. The hinge 34 has a rotational axis B that about which the hook 20 is rotatable relative to the base 18. In other words, when a load is applied to the hook 20, the hook 20 rotates about the hinge 34. The rotational axis B may be vertical. The hinge 34 may be of any type of hinge 34 that allows the hook 20 of the tow hook 16 to rotate relative to the base 18.

As one example, the hinge 34 may include a post 36 between the hook 20 and the base 18. The post 36 connects the hook 20 and the base 18. The post 36 may space the hook 20 and the base 18 along the vertical axis, as shown in FIGS. 5 and 6. The post 36 is rotatable relative to at least one of the hook 20 and the base 18. As one example, at least one of the base 18 and the hook 20 includes a hole 38 that receives the post 36 with the post 36 being rotatable in the hole. In such an example, both the base 18 and the hook 20 may include the hole 38 that receives the post 36, or one of the base 18 and the hook 20 may include the hole 38 that receives the post 36 and the post 36 is fixed relative to the other of the base 18 and the hook 20, e.g., by welding, integral formation, etc. The post 36 may be, for example, a bolt having a head and a threaded end that engages a nut.

As set forth above, the spring 22, 122 is between the base 18 and the hook 20. The spring 22, 122 is positioned to bias the hook 20 from the retracted position to the extended position. The spring 22, 122 operatively engages the base 18 and the hook 20 to bias the hook 20 from the retracted position to the extended position. Rotation of the hook 20 toward the retracted position loads the spring 22, 122 and the spring 22, 122 returns the hook 20 to the extended position when a load is removed from the hook 20.

In one example, the hook 20 may be unbiased by the spring 22, 122 when the hook 20 is in the extended position, i.e., the spring 22, 122 does not bias the hook 20 when the hook 20 is in the extended position. In such an example, the spring 22, 122 is sized, shaped, and/or positioned such that the spring 22, 122 is not loaded by the hook 20 until the hook 20 is rotated from the extended position toward the retracted position.

In another example, the spring 22 may continuously bias the hook 20 toward the extended position, i.e., even when the hook 20 is in the extended position. In such an example, a component stops the hook 20 in the extended position to counteract the spring 22 force while still allowing the hook 20 to rotate from the extended position to the retracted position. For example, as shown in FIGS. 5 and 6, a stop 46 prevents clockwise rotation of the hook 20 and allows counterclockwise rotation of the hook 20. For example, the stop 46 may be on the hook 20, the base 18, the vehicle frame 14, and/or the bumper 24.

As shown in the figures, the spring 22, 122 may be coiled about the hinge 34. Specifically, the spring 22, 122 may be coiled about the post 36. In the example shown in FIGS. 3-6, one end of the spring 22 engages the base 18 and the other end of the spring 22 engages the hook 20 to bias the hook 20 toward the extended position. In other words, one end of the spring 22, 122 is fixed to the base 18 and the other end of the spring 22, 122 is fixed to the hook 20. Spring force builds in the spring 22, 122 when the hook 20 rotates to the retracted position because the end of the spring 22, 122 rotates with the hook 20.

In the example shown in FIGS. 7-9, a second spring 123 may be coiled about the hinge, e.g., about post 36. The second spring 123 may be positioned below the spring 122. The assembly may include a collar 48 fixed to the post 36. The collar 48 may be positioned between the spring 122 and the second spring 123. The spring 122 may be positioned above the collar 48 and the second spring 123 may be positioned below the collar 48. In such an example, one end of the spring 122 engages the base 18 and the other end of the spring 122 engages the collar 48 while one end of the second spring 123 engages the collar 48 and the other end of the second spring 123 engages the hook 20 to bias the hook 20 toward the extended position. In other words, one end of the spring 122 is fixed to the base 18 and the other end of the spring 122 is fixed to the collar 48 while one end of the second spring 123 is attached to the collar 48 and the other end of the second spring 123 is attached to the hook 20. Spring force builds in the spring 122 when the hook 20 rotates to the retracted position because the end of the spring 122 rotates with the collar 48. Tension builds in the second spring 123 when the hook rotates to the second retracted position because the end of the second spring 123 rotates with the hook 20.

With continued reference to FIG. 7, the hook 20 may rotate relative to the base 18 to a second retracted position. The second retracted position is opposite the retracted position. The hook 20 rotates relative to the base 18 and about the rotational axis in a clockwise rotation such that the hook 20 is in the second retracted position. When the hook 20 is in the second retracted position, the hook 20 is recessed behind the class-A surface of the bumper 24.

The spring 122 and the second spring 123 oppose one another. The spring force of the spring 122 is opposite the spring force of the second spring 123 to bias the hook 20 toward the extended position. In other words, the spring 122 and the second spring 123 operate against each other to maintain the hook 20 in the extended position when no external forces are applied to the hook 20. In one example, if an object impacts the hook 20 and rotates the hook 20 toward the retracted position, the spring 122 is loaded and subsequently biases the hook 20 back toward the extended position. In this same example, if an object impacts the hook 20 and rotates the hook 20 toward the second retracted position, the second spring 123 is loaded and subsequently biases the hook 20 back toward the extended position. The position of the spring 122 and the second spring 123 are interchangeable, i.e., the spring 122 may rotate the hook 20 from the second retracted position to the extended position and the second spring 123 may rotate the hook 20 from the retracted position to the extended position.

As shown in the figures, the spring 22, 122 and the second spring 123 may each be a torsion spring. As another example, the spring 22, 122 and the second spring 123 may be any type of spring that would be suitable to bias the hook 20 toward the extended position. A sheath may surround the post 36 and springs 22, 122, 123 to protect from pinching or other injuries while the tow hook 16 is being used to tow the vehicle or when the tow hooks 16 are being serviced.

In one example, the hinge 34 is offset from the axis A in a cross-vehicle direction $C_1$, $C_2$. For example, as shown in FIGS. 3,4, and 7, the base 18 curves from the vehicle frame 14 to the hinge 34 in a cross-vehicle direction $C_1$ and in a vehicle-forward direction $D_F$ (in the example where the tow hook 16 is at the rear of the vehicle 12, the base 18 curves in a cross-vehicle direction $C_1$ and a vehicle-rearward direction $D_R$). The base 18 curves to the left in the view shown in FIGS. 3 and 4, and the base 18 may alternatively curve to the right.

Since the hinge 34 is offset from the axis A in a cross-vehicle direction $C_1$, impact with an object causes the hook 20 to rotate, as shown in the progression from FIG. 3 to FIG. 4. In other words, the offset creates a moment when the hook 20 is impacted by the object, which cases the hook 20 to rotate about the hinge 34. The base 18 and the hook 20 may curve in opposite directions to encourage the rotation of the hook 20 to the retracted position when impacted. For example, with reference to FIGS. 3-4, the base 18 may curve from the frame to the hinge 34 in a first cross-vehicle direction $C_1$ and the hook 20 may curve from the hinge 34 to the free end 32 in a second cross-vehicle direction $C_2$ opposite the first cross-vehicle direction $C_1$. In the view shown in FIGS. 3 and 4, the first cross-vehicle direction $C_1$ is to the left and the second cross-vehicle direction $C_2$ is to the right. Alternatively, the first cross-vehicle direction $C_1$ may be to the right and the second cross-vehicle direction $C_2$ may be to the left in the view shown in FIGS. 3 and 4. The curve of the hook 20 in a direction opposite the curve of the base 18 encourages rotation of the hook 20 toward the retracted position when impacted by an object. The curve of the hook 20 in a direction opposite the curve of the base 18 encourages rotation of the hook 20 toward the retracted position when impacted by an object regardless of the cross-vehicle position of the object. In other words, in a scenario where the object is offset from the axis A, when the object impacts the hook 20, the geometry of the opposite curves of the base 18 and the hook 20 encourages rotate of the hook 20 toward the retracted position.

In another example, the base may be straight from the frame along the axis. In this example, the hook may rotate about the rotational axis when an object impacts the hook in the same way as described above.

The hook 20 may be arcuate. Specifically, the free end 32 of the hook 20 may be arcuate. This shape encourages rotation of the hook 20 toward the retracted position when impacted by an object regardless of the cross-vehicle position of the object.

With reference to FIG. 4, the base 18 defines a recess 40 and the hook 20 is rotatable into the recess 40. Specifically, the curve of the base 18 from the frame to the hinge 34 defines the recess 40 between the base 18 and the hook 20. The recess 40 defined by the hook 20 is open to the hook 20 so that the hook 20 is rotatable into the recess 40. The recess 40 may be sized to receive the hook 20 in the retracted position.

In the embodiment shown in FIGS. 3-6, in operation, the hook 20 may be in the extended position in the absence of an external force on the hook 20. For example, the hook 20 may extend through the access hole 26 of the bumper 24 in the extended position, as shown in FIGS. 1-3. When impacted by an object with suitable force, the hook 20 rotates from the extended position toward the retracted position, as shown in FIG. 4. In the retracted position, the hook 20 may be disposed in the recess 40 defined by the base 18. As the hook 20 rotates toward the retracted position, the hook 20 loads the spring 22, which absorbs energy from the object. Once the object is moved such that force on the hook 20 is removed, the spring 22 rotates the hook 20 back to the extended position.

In the example shown in FIGS. 7-9, in operation, when the tow hook 16 is impacted by an object of suitable force, the hook 20 rotates from the extended position toward the second retracted position, as shown in FIG. 7. As the hook 20 rotates toward the second retracted position, the hook 20 loads the springs 122, 123, which absorb energy from the object. Once the object is removed such that force on the hook 20 is removed, the springs 122, 123 rotate the hook 20 back to the extended position.

In one example, if an object impacts the hook 20 and rotates the hook 20 toward the retracted position, the spring 122 may bias the hook 20 back toward the extended position. In this same example, if an object impacts the hook 20 and rotates the hook 20 toward the second retracted position, the second spring 123 may bias the hook 20 back toward the extended position. The position of the spring 122 and the second spring 123 are interchangeable, i.e., the spring 122 may rotate the hook 20 from the second retracted position to the extended position and the second spring 123 may rotate the hook 20 from the retracted position to the extended position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a vehicle frame;
a base fixed relative to the vehicle frame and a hook supported by the base and rotatable relative to the base between an extended position and a retracted position;
a spring between the base and the hook positioned to bias the hook toward the extended position; and
the hook being rotatable relative to the base about a vertical axis.

2. The assembly of claim 1, further comprising a hinge between the hook and the base.

3. The assembly of claim 2, wherein the spring is coiled about the hinge.

4. The assembly of claim 2, wherein the hinge includes a post between the hook and the base.

5. The assembly of claim 4, wherein the spring is coiled about the post.

6. The assembly of claim 5, further comprising a second spring coiled about the post, the second spring positioned below the spring.

7. The assembly of claim 6, further comprising a collar fixed to the post between the spring and the second spring.

8. The assembly of claim 7, wherein the hook is rotatable relative to the base to a second retracted position opposite the retracted position.

9. The assembly of claim 2, wherein the base extends from the vehicle frame along an axis and the hinge is offset from the axis in a cross-vehicle direction.

10. The assembly of claim 9, wherein the hinge is rotatable about the rotational axis.

11. The assembly of claim 2, wherein the base curves from the vehicle frame to the hinge defining a recess between the vehicle frame and the hook and the hook rotates into the recess from the extended position to the retracted position.

12. The assembly of claim 2, wherein the base curves from the vehicle frame to the hinge in a first cross-vehicle direction and the hook curves from the hinge to a free end in a second cross-vehicle direction opposite the first cross-vehicle direction.

13. The assembly of claim 12, wherein the base defines a recess and the hook is rotatable into the recess.

14. The assembly of claim 1, wherein the base defines a recess and the hook is rotatable into the recess.

15. The assembly of claim 1, wherein the base curves from the vehicle frame to the hook in a first cross-vehicle direction and the hook curves from the base to a free end in a second cross-vehicle direction opposite the first cross-vehicle direction.

16. The assembly of claim 15, wherein the base defines a recess and the hook is rotatable into the recess.

17. The assembly of claim 1, wherein the hook is unbiased by the spring when the hook is in the extended position.

18. The assembly of claim 1, further comprising a bumper, the hook extending through the bumper in the extended position and recessed behind the bumper in the retracted position.

19. An assembly of claim 1, wherein the spring is a torsion spring.

20. An assembly comprising:
a vehicle frame;
a base fixed relative to the vehicle frame and a hook supported by the base and rotatable relative to the base between an extended position and a retracted position;
a spring between the base and the hook positioned to bias the hook toward the extended position; and
the base defining a recess and the hook is rotatable into the recess.

21. An assembly comprising:
a vehicle frame;
a base fixed relative to the vehicle frame and a hook supported by the base and rotatable relative to the base between an extended position and a retracted position;
a spring between the base and the hook positioned to bias the hook toward the extended position; and
a bumper, the hook extending through the bumper in the extended position and recessed behind the bumper in the retracted position.

* * * * *